United States Patent
Lovisotto (10) Patent No.: US 10,008,877 B2
(45) Date of Patent: *Jun. 26, 2018

(54) ELECTRIC HOUSEHOLD APPLIANCE AND METHOD FOR REDUCING STAND-BY STATE ENERGY CONSUMPTION USING A SWITCHING MODE LOW POWER SUPPLY UNIT

(75) Inventor: Giuliano Lovisotto, Besana in Brianza (IT)

(73) Assignee: ELECTROLUX HOME PRODUCTS CORPORATION N.V., Brussels (BE)

( * ) Notice: Subject to any disclaimer, the term of this patent is extended or adjusted under 35 U.S.C. 154(b) by 1254 days.

This patent is subject to a terminal disclaimer.

(21) Appl. No.: 13/876,242

(22) PCT Filed: Sep. 21, 2011

(86) PCT No.: PCT/EP2011/066452
§ 371 (c)(1),
(2), (4) Date: Jun. 7, 2013

(87) PCT Pub. No.: WO2012/041754
PCT Pub. Date: Apr. 5, 2012

(65) Prior Publication Data
US 2013/0278066 A1 Oct. 24, 2013

(30) Foreign Application Priority Data
Sep. 28, 2010 (EP) ..................... 10180676

(51) Int. Cl.
*H02J 9/00* (2006.01)
*H02J 9/04* (2006.01)
*D06F 33/02* (2006.01)

(52) U.S. Cl.
CPC ................ *H02J 9/04* (2013.01); *D06F 33/02* (2013.01); *H02J 9/005* (2013.01); *D06F 2202/12* (2013.01); *Y10T 307/549* (2015.04)

(58) Field of Classification Search
CPC ................................... H02J 9/005; H02J 9/04
See application file for complete search history.

(56) References Cited

U.S. PATENT DOCUMENTS 3,603,732 A 9/1971 George
3,641,393 A 2/1972 Florance et al.
(Continued)

FOREIGN PATENT DOCUMENTS

CA 2523166 4/2007
DE 10 2006 054539 B3 2/2008
(Continued)

OTHER PUBLICATIONS

Mar. 24, 2016—U.S. Non Final Office Action—U.S. Appl. No. 13/876,246.
(Continued)

*Primary Examiner* — Fritz M Fleming
(74) *Attorney, Agent, or Firm* — Ratnerprestia (57) ABSTRACT

A household appliance (1) includes an electronic command device (3) configured to reduce standby-state energy consumption of the electric household appliance (1). The electronic command device (3) includes an electronic control unit (20) and a switching mode low power supply unit (6) with a switching regulator unit (13) having a first control terminal (11) and at least an output terminal (9) which supplies a main prefixed supply voltage (VB) to the electronic control unit (20). The switching mode low power supply unit (6) is further configured to switch from a standby state to an operating state, when a prefixed voltage variation (ΔV) on the first control terminal (11) is detected. The switching mode low power supply unit (6) includes auxiliary supply means (14) which supply a low supply voltage (V1) different than zero to the first control terminal (11) during at least the standby state.

20 Claims, 2 Drawing Sheets (56) References Cited

U.S. PATENT DOCUMENTS

| | | | |
|---|---|---|---|
| 3,831,065 | A | 8/1974 | Martin et al. |
| 4,015,171 | A | 3/1977 | Miller |
| 4,665,355 | A | 5/1987 | McCollum et al. |
| 5,309,939 | A | 5/1994 | Stickel et al. |
| 5,387,848 | A | 2/1995 | Wong |
| 5,453,921 | A | 9/1995 | Shutts |
| 5,525,948 | A | 6/1996 | Poulsen |
| 5,656,946 | A | 8/1997 | Sim |
| 5,926,394 | A | 7/1999 | Nguyen et al. |
| 5,949,660 | A | 9/1999 | Rehm et al. |
| 5,961,207 | A | 10/1999 | Petkovic |
| 6,043,994 | A | 3/2000 | Keller |
| 6,414,864 | B1 | 7/2002 | Hoshi |
| 6,496,390 | B2 | 12/2002 | Yang |
| 6,509,658 | B1 | 1/2003 | Kim |
| 6,636,026 | B1 | 10/2003 | Nomoto |
| 6,684,111 | B2 | 1/2004 | Klein et al. |
| 6,724,220 | B1 | 4/2004 | Snyder et al. |
| 6,995,807 | B2 | 2/2006 | Libera |
| 7,444,530 | B2 | 10/2008 | Deppe et al. |
| 7,730,507 | B2 | 6/2010 | Sakai et al. |
| 7,765,416 | B2 | 7/2010 | Zhou |
| 7,770,039 | B2 | 8/2010 | DuBose |
| 7,840,142 | B2 | 11/2010 | Keller |
| 7,948,283 | B2 | 5/2011 | Tseng et al. |
| 8,278,900 | B2 | 10/2012 | Strijker et al. |
| 8,416,553 | B2 | 4/2013 | Zhan et al. |
| 9,136,777 | B2 | 9/2015 | Ettes et al. |
| 9,492,056 | B2 * | 11/2016 | Lovisotto ............ H02J 9/005 |
| 2002/0190797 | A1 | 12/2002 | Deppe et al. |
| 2003/0086024 | A1 | 5/2003 | Libera |
| 2004/0041903 | A1 * | 3/2004 | Drexler ............ H04N 5/4401 348/14.01 |
| 2005/0041360 | A1 | 2/2005 | Dettweiler |
| 2008/0006762 | A1 | 1/2008 | Fadell et al. |
| 2009/0021969 | A1 | 1/2009 | Butler et al. |
| 2009/0295226 | A1 | 12/2009 | Hodges et al. |
| 2009/0300400 | A1 | 12/2009 | Dubose |
| 2010/0050002 | A1 | 2/2010 | Huang |
| 2010/0090534 | A1 | 4/2010 | Federmann et al. |
| 2010/0115317 | A1 | 5/2010 | Aurich et al. |
| 2010/0306558 | A1 | 12/2010 | Kang |
| 2011/0103104 | A1 | 5/2011 | Zhan et al. |
| 2011/0115296 | A1 | 5/2011 | Watson et al. |
| 2011/0116288 | A1 | 5/2011 | Sauter et al. |
| 2012/0001607 | A1 | 1/2012 | Wang |
| 2012/0293153 | A1 | 11/2012 | Garb et al. |
| 2013/0062968 | A1 | 3/2013 | Lovisotto et al. |
| 2013/0128639 | A1 | 5/2013 | Ettes et al. |
| 2013/0200729 | A1 | 8/2013 | Lovisotto et al. |
| 2013/0257395 | A1 | 10/2013 | Lovisotto et al. |

FOREIGN PATENT DOCUMENTS

| | | |
|---|---|---|
| DE | 102008011279 A1 | 6/2009 |
| EP | 1231698 A2 | 8/2002 |
| EP | 2 063 523 A2 | 5/2009 |
| JP | 2006-072257 | 3/2006 |
| WO | WO 2006072917 A2 * | 7/2006 ......... H02M 1/4225 |

OTHER PUBLICATIONS

Mar. 3, 2016—U.S. Final Office Action—U.S. Appl. No. 13/876,241.
Jan. 15, 2016—U.S. Final Office Action—U.S. Appl. No. 13/637,821.
Jun. 20, 2016—U.S. Office Action—U.S. Appl. No. 13/637,821.
International Search Report issued in corresponding International Application No. PCT/EP2011/066452, dated Dec. 30, 2011.
Extended European Search Report issued in corresponding European Application No. 10180676.8 dated Apr. 11, 2011.
International Search Report issued in related International Application No. PCT/EP2011/066795, dated Sep. 2, 2012.
Extended European Search Report issued in related European Application No. 10180671.9, dated Apr. 11, 2011.
International Search Report issued in related International Application No. PCT/EP2011/066433, dated Nov. 25, 2011.
Extended European Search Report issued in related European Application No. 10180589.3 dated Apr. 1, 2011.
International Search Report issued in related International Application No. PCT/EP2011/054805, dated Apr. 28, 2011.
Feb. 16, 2016 U.S. Non Final Office Action—U.S. Appl. No. 13/637,816.
Aug. 7, 2015—U.S. Non Final Rejection—U.S. Appl. No. 13/876,241.
Oct. 21, 2014—U.S. Non Final Rejection—U.S. Appl. No. 13/876,246.
Jul. 14, 2015—U.S. Non Final Rejection—U.S. Appl. No. 13/876,246.
Nov. 19, 2015—U.S. Final Rejection—U.S. Appl. No. 13/876,246.
Jul. 17, 2015—U.S. Non Final Rejection—U.S. Appl. No. 13/637,821.
International Search Report issued in related International Application No. PCT/EP2011/054803; dated Dec. 16, 2011.
Extended European Search Report issued in related European Application No. 10158329.2 dated Oct. 19, 2010.
International Search Report issued in corresponding International Application No. PCT/EP2011/054805, dated Apr. 28 2011.
Extended European Search Report issued in corresponding European Application No. 10158335.9, dated Sep. 1, 2010.
Oct. 5, 2016—U.S. Notice of Allowance—U.S. Appl. No. 13/876,241.
Jan. 3, 2017—U.S. Notice of Allowance—U.S. Appl. No. 13/637,821.
Feb. 9, 2017—U.S. Office Action—U.S. Appl. No. 13/637,816.
Kevin M. O'Hornett; "PROSPEX, Electrical System Bonding and Grounding", copyright 2006, PROSPEX sm, pp. 1-2.
Aug. 9, 2016—U.S. Office Action—U.S. Appl. No. 13/637,816.
Oct. 16, 2017—(US) Notice of Allowance—U.S. Appl. No. 13/637,816.

* cited by examiner

ELECTRIC HOUSEHOLD APPLIANCE AND METHOD FOR REDUCING STAND-BY STATE ENERGY CONSUMPTION USING A SWITCHING MODE LOW POWER SUPPLY UNIT

CROSS-REFERENCE TO RELATED APPLICATIONS

The following applications include subject matter that is related to the subject matter of this application: U.S. patent application Ser. Nos. 13/876,246, 13/876,241, 13/637,821, and 13/637,816.

TECHNICAL FIELD OF THE INVENTION

The present invention relates to reducing standby-state energy consumption of an electric household appliance, in particular a dish-laundry treatment machine, i.e. a laundry washing machine, or a dishwasher, or dryer machine, during a standby state; to which the following description refers purely by way of example.

STATE OF THE ART

As is known, some new-generation electric household appliances are designed to switch automatically, at the end of an operating cycle, from an operating state to a standby state, in which they remain at rest, waiting a user command to start a new operating cycle.

To reduce energy consumption of the electric household appliance, electronic control devices have been devised over the past few years to switch the appliance to the standby state, at the end of an operating cycle, by automatically opening a number of switches between the electric power network and the appliance devices, to cut off power to the devices, and which, on receiving an enabling signal, close the switches to power the devices and perform another operating cycle.

Though undoubtedly reducing standby-state energy consumption of electric household appliances, the reduction afforded by such electronic control devices fails to comply with recent regulations governing the energy consumption of new-generation appliances wherein it is required to have power consumption below a one watt energy threshold.

OBJECT AND SUMMARY OF ASPECTS OF THE INVENTION

An aim of the present invention is hence to provide a method and an electronic control device designed to perform as described above, while maintaining standby-state consumption of the electric household appliance, preferably, below a one watt energy threshold.

The above aim may be achieved by the present invention, which relates to a method and an electric household appliance provided with an electronic control device.

In detail, a first aspect of the present invention provides a method for reducing standby-state energy consumption of an electric household appliance, which is provided with an electronic control unit and a switching mode low power supply unit comprising a first control terminal and an output terminal which supplies a main prefixed supply voltage to the electronic control unit; the switching mode low power supply unit is configured to switch between a standby state and an operating state, when a prefixed voltage variation on the first control terminal is detected; the method being characterized by connecting, at least temporarily, the first control terminal to the output terminal of the switching mode low power supply unit, or to an independent auxiliary terminal having a predetermined voltage, to generate the prefixed voltage variation on the first control terminal to cause the switching mode low power supply unit to switch from one of the states to the other state.

Preferably, the output terminal is maintained at zero voltage during the standby state; the method comprises the steps of constantly supplying a predetermined low supply voltage, different than zero, to the first control terminal during at least the standby state, and connecting, at least temporarily, the first control terminal to the output terminal, or to the independent auxiliary terminal having zero voltage, to generate the prefixed voltage variation on the first control terminal to cause the switching mode low power supply unit to switch from one of the states to the other state.

Preferably, the switching mode low power supply unit comprises a second control terminal and is configured to switch from the operating state to the standby state, on receiving a command signal on the second control terminal. The method comprises the step of generating the command signal on the basis of the output terminal voltage.

Preferably, the electronic control unit comprises a sensing terminal and is configured to generate the command signal, on receiving a prefixed voltage variation on the sensing terminal; the method comprises the step of connecting the sensing terminal to the output terminal to vary the voltage on the sensing terminal to cause the switching mode low power supply unit to switch from the operating state to the standby state.

Preferably, the switching mode low power supply unit comprises a switching regulator unit having the first control terminal and the output terminal and being configured to switch from standby state to operative state, when a prefixed voltage variation on the first control terminal is detected; and a low voltage auxiliary supply means constantly supplying the predetermined low voltage, different than zero, to the first control terminal during at least the standby state; during said standby state, the method comprises the step of turning-off the switching regulator unit and maintains turning-on the low voltage auxiliary supply means to supply the predetermined low voltage different than zero to the first control terminal.

A second aspect of the present invention provides a household appliance provided with an electronic control device configured to reduce appliance standby consumption and comprising an electronic control unit, and a switching mode low power supply unit comprising a first control terminal and an output terminal, which supplies a main prefixed supply voltage to the electronic control unit. The switching mode low power supply unit is configured to switch between a standby state and an operating state, when a prefixed voltage variation on the first control terminal is detected. The electronic control device is configured to connect, at least temporarily, the first control terminal to the output terminal, or to an independent auxiliary terminal having a predetermined voltage, to generate the prefixed voltage variation on the first control terminal to cause the switching mode low power supply unit to switch from one of the states to the other state.

Preferably, the switching mode low power supply unit is provided with a switching regulator unit comprising the first command terminal and the output terminal outputting the voltage supply to the electronic control unit and auxiliary low voltage supply means which constantly supply a predetermined low voltage, different than zero, to the first control terminal during at least the standby state. The switching regulator unit is configured to switch from the standby state to the operating state, when a predetermined variation voltage on the first control terminal is detected.

Preferably, the switching regulator unit comprises a second command terminal and is configured to switch from the operating state to the standby state, when a command signal is received on the second control terminal. The electronic control unit comprises a sensing terminal and is configured to generate the command signal when the predetermined voltage variation on the sensing terminal is detected.

Preferably, the electronic command device comprises switching means having a first and a second terminal respectively connected to the output terminal and to the first control terminal; operation on the switching means causes the variation voltage on the first control terminal or generation of the command signal on the basis of the voltage on the output terminal.

Preferably, the electronic control unit is configured to automatically switch from an on-state to an off-state, when the switching regulator unit switches on the standby state.

A further aspect of the present invention provides an electronic control device configured to reduce standby consumption of a household appliance; the electronic control device comprises an electronic control unit, a switching mode low power supply unit having a first control terminal and an output terminal which supplies a main prefixed supply voltage to the electronic control unit; the switching mode low power supply unit is further configured to switch between a standby state and an operating state, when a prefixed voltage variation on the first control terminal is detected; the electronic control device is configured to connect, at least temporarily, the first control terminal to the output terminal, or to an independent auxiliary terminal having a predetermined voltage, to generate the prefixed voltage variation on the first control terminal to cause the switching mode low power supply unit to switch from one of the states to the other state.

Preferably, the switching mode low power supply unit is provided with a switching regulator unit comprising the first control terminal and the output terminal outputting the voltage supply to the electronic control unit and auxiliary low voltage supply means which supply a predetermined low voltage, different than zero, to the first control terminal during at least the standby state; the switching regulator unit is configured to switch from the standby state to the operating state, when a predetermined variation voltage on the first control terminal is detected.

Preferably, the switching regulator unit comprises a second command terminal and is configured to switch from the operating state to the standby state, upon receiving a command signal on the second control terminal; the electronic control unit comprises a sensing terminal and is configured to generate the command signal when the predetermined voltage variation on the sensing terminal is detected.

Preferably, the electronic command device comprises switching means having a first and a second terminal respectively connected to the output terminal and to the first control terminal; operation on the switching means causes the variation voltage on the first control terminal or generation of the command signal on the basis of the output terminal voltage; the electronic control unit is configured to automatically switch from an on-state to an off-state, when the switching regulator unit switches on the standby state.

Preferably the electronic control unit is configured to determine a power fail when, on switching from the off-state to the on-state, it detects no voltage variation on the sensing terminal.

A further aspect of the present invention provides a method for reducing standby-state energy consumption of an electric household appliance comprising an electronic control unit, and a switching mode low power supply unit which supplies a main prefixed supply voltage to the electronic control unit; the switching mode low power supply unit comprises at least a first control terminal and at least a output terminal which supplies said main prefixed supply voltage to the electronic control unit; the switching mode low power supply unit being further configured to switch from an operating state to a standby state when the first control terminal receives a command signal; the electronic control unit having a sensing terminal and being configured to generate the command signal when a predetermined voltage variation on said sensing terminal is detected; the method being characterized by the step of connecting said sensing terminal to the output terminal, at least temporarily, to cause the electronic control unit to generate the command signal so that said switching mode low power supply unit switches from the operating state to the standby state.

Preferably, the switching mode low power supply unit has a second command terminal and is further configured to switch from the standby state to the operating state, when a prefixed voltage variation on the second control terminal is detected; the method comprising the steps of connecting, at least temporarily, the second control terminal to the output terminal, or to an independent auxiliary terminal having a predetermined voltage, to cause the prefixed voltage variation on said second control terminal so that the switching mode low power supply unit switches from the standby state to said operating state.

Preferably, the output terminal is maintained at zero voltage during said standby state; and the method comprises the steps of supplying a predetermined low voltage different to zero to the second control terminal during at least the standby state; connecting, at least temporarily, the second control terminal to the output terminal, or to an independent auxiliary terminal having zero voltage, to generate the prefixed voltage variation on the second control terminal to cause the switching mode low power supply unit to switch from the standby state to the operating state.

Preferably, the switching mode low power supply unit comprises a switching regulator unit comprising the second control terminal and the output terminal and being configured to switch from the standby state to the operating state, when a prefixed voltage variation on the second control terminal is detected; and a low voltage auxiliary supply means supplyies the predetermined low voltage, different than zero, to the second control terminal during at least the standby state; the method comprises the step of turning-off said switching regulator unit during the standby state and maintains turn-on of said low voltage auxiliary supply means so as to supply the predetermined low voltage different than zero to the second control terminal.

Preferably, there is also provided an electric household appliance provided with an electronic command device comprising an electronic control unit and a switching mode low power supply unit designed to supply a predetermined supply voltage to the electronic control unit; the switching mode low power supply unit comprising at least a first control terminal and at least an output terminal supplying the main prefixed supply voltage to the electronic control unit; the switching mode low power supply unit being further configured to switch from an operating state to a standby state, when the first control terminal receives a command signal; the electronic control unit having a sensing terminal and being configured to generate the command signal when a predetermined voltage variation on the sensing terminal is detected; the household appliance being characterized in that said electronic command device is configured to connect the sensing terminal to the output terminal, at least temporarily, to cause the electronic control unit to generate the command signal so that the switching mode low power supply unit switches from the operating state to the standby state.

Preferably, the switching mode low power supply unit has a second command terminal and is further configured to switch from the standby state to the operating state, when a prefixed voltage variation on the second control terminal is detected; the electronic command device being configured to connect, at least temporarily, the second control terminal to the output terminal, or to an independent auxiliary terminal having a predetermined voltage, to cause the prefixed voltage variation on the second control terminal so that the switching mode low power supply unit switches from the standby state to the operating state.

Preferably, the switching mode low power supply unit comprises: a switching regulator unit comprising the second control terminal and the output terminal and being configured to switch from the standby state to the operating state, when a prefixed voltage variation on the second control terminal is detected; a low voltage auxiliary supply means supplying said predetermined low voltage, different to zero, to said second control terminal during at least standby state; said switching mode low power supply unit being configured to turn-off said switching regulator unit during said standby state and maintains turn-on of said low voltage auxiliary supply means so as to supply said predetermined low voltage different than zero to said second control terminal.

Preferably, the electronic command device comprises switching means having a first and a second terminal respectively connected to said output terminal and to said second control terminal of said a switching regulator unit; operation of said switching means causes the variation voltage on said second command terminal or generation of said turn-off signal on the basis of the voltage of said output terminal.

A further aspect of the present invention provides a electronic command device of a household appliance, provided with an electronic control unit and a switching mode low power supply unit designed to supply a predetermined supply voltage to the electronic control unit; the switching mode low power supply unit comprising at least a first control terminal and at least an output terminal supplying the main prefixed supply voltage to the electronic control unit; the switching mode low power supply unit being further configured to switch from a operating state to a standby state, when the first control terminal receives a command signal; the electronic control unit having a sensing terminal and being configured to generate the command signal when detects a predetermined voltage variation on the sensing terminal; the household appliance being characterized in that said electronic command device is configured to connect the sensing terminal to the output terminal, at least temporarily, to cause the electronic control unit to generate the command signal so that the switching mode low power supply unit switch from operating state to standby state.

Preferably, the switching mode low power supply unit has a second command terminal and is further configured to switch from the standby state to the operating state, when a prefixed voltage variation on the second control terminal is detected; the electronic command device being configured to connect, at least temporarily, the second control terminal to the output terminal, or to an independent auxiliary terminal having a predetermined voltage, to cause the prefixed voltage variation on the second control terminal so that the switching mode low power supply unit switches from standby state to the operating state.

Preferably, the switching mode low power supply unit comprises: a switching regulator unit comprising the second control terminal and the output terminal and being configured to switch from the standby state to the operating state, when a prefixed voltage variation on the second control terminal is detected; low voltage auxiliary supply means supplies said predetermined low voltage, different than zero, to said second control terminal during at least standby state; said switching mode low power supply unit being configured to turn-off said switching regulator unit during said standby state and maintains turn-on of said low voltage auxiliary supply means so as to supply said predetermined low voltage different than zero to said second control terminal.

A further aspect of the present invention provides a method for reducing standby-state energy consumption of an electric household appliance comprising an electronic control unit, and a switching mode low power supply unit comprising a switching regulator unit having a first control terminal and at least an output terminal which supplies a main prefixed supply voltage to the electronic control unit; the switching mode low power supply unit being further configured to switch from a standby state to an operating state, when a prefixed voltage variation on the first control terminal is detected; the method being characterized in: supplying a low supply voltage different to zero to said first control terminal during at least the standby state; connecting said first control terminal to a reference terminal having a zero voltage, at least temporarily, to cause said prefixed voltage variation on said first command terminal so that the switching regulator unit switches from the standby state to said operating state.

Preferably, the reference terminal comprises said output terminal of the switching regulator unit or an independent auxiliary terminal having a zero voltage.

Preferably, the output terminal has zero voltage during said standby state; the method comprising the steps of supplying a predetermined low voltage different to zero to said first control terminal during at least standby state; connecting, at least temporarily, said first control terminal to said output terminal, or to an independent auxiliary terminal having zero voltage, to generate said prefixed voltage variation on the first control terminal so as to cause said switching regulator unit to switch from the standby state to the operating state.

Preferably, the switching regulator unit has a second command terminal and is further configured to switch from the standby state to the operating state, upon receiving a command signal on the second command terminal; the method comprises the steps of generating said command signal according to said output terminal voltage.

Preferably, the electronic control unit comprises a sensing terminal and is configured to generate said command signal when variation voltage on said sensing terminal is detected; the method comprises the step of connecting said sensing terminal to said output terminal to generate said predetermined variation voltage to cause said switching regulator unit to switch from operating state to standby state.

Preferably, the switching mode power supply unit comprises low voltage auxiliary means designed to supply said low supply voltage to said first command terminal during at least the standby state; the method comprises the step of turning-off said switching regulator unit, during said standby state, and maintaing turn on of said low voltage auxiliary means to supply said low supply voltage to said first command terminal.

A further aspect of the present invention provides an household appliance comprising a electronic command device configured to reduce standby-state energy consumption of the electric household appliance; electronic command device comprising an electronic control unit and a switching mode low power supply unit comprising a switching regulator unit having a first control terminal and at least an output terminal which supplies a main prefixed supply voltage to the electronic control unit; the switching mode low power supply unit being further configured to switch from a standby state to an operating state, when a prefixed voltage variation on the first control terminal is detected; the household appliance being characterized in that said switching mode low power supply unit comprises auxiliary supply means which supply a low supply voltage different than zero to said first control terminal during at least the standby state; and in that electronic command device is configured to connect said first control terminal to a reference terminal having a zero voltage, at least temporarily, to cause said prefixed voltage variation on said first command terminal so that the switching regulator unit switches from the standby state to said operating state.

Preferably, the switching regulator unit has a second command terminal and is further configured to switch from the standby state to the operating state, upon receiving a command signal on the second command terminal; said auxiliary supply means being configured to supply a low supply voltage different than zero to the first command terminal during at least the standby state; said electronic command device being configured to connect said first command terminal to said output terminal at least temporarily during standby state, or to the independent terminal having a zero voltage, to cause the switching regulator unit to switch from the standby state to the operating state.

Preferably, the switching regulator unit has a second command terminal and is further configured to switch from the standby state to the operating state, upon receiving a command signal on the second control terminal; said electronic control unit being configured to generate said command signal on the basis of the output terminal voltage.

A further aspect of the present invention provides an electronic command device configured to reduce standby-state energy consumption of a electric household appliance; the electronic command device comprises an electronic control unit and a switching mode low power supply unit comprising a switching regulator unit having a first control terminal and at least an output terminal which supplies a main prefixed supply voltage to the electronic control unit; the switching mode low power supply unit being further configured to switch from a standby state to an operating state, when detecting a prefixed voltage variation on the first control terminal; the household appliance being characterized in that said switching mode low power supply unit comprises auxiliary supply means which supply a low supply voltage different than zero to said firs control terminal during at least the standby state; and in that electronic command device is configured to connect said first control terminal to a reference terminal having a zero voltage, at least temporarily, to cause said prefixed voltage variation on said first command terminal so that the switching regulator unit switches from the standby state to said operating state.

BRIEF DESCRIPTION OF THE DRAWINGS

A non-limiting embodiment of the present invention will be described by way of example with reference to the accompanying drawings, in which.

DETAILED DESCRIPTION OF PREFERRED EMBODIMENTS OF THE INVENTION

Figure 1:
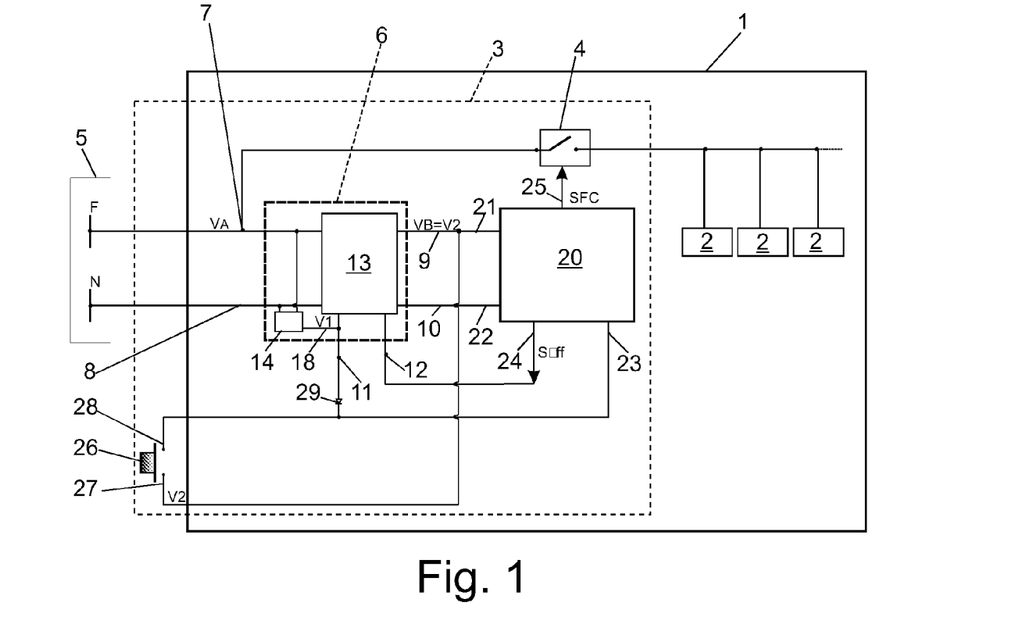
FIG. 1 shows, schematically, a household appliance provided with an electronic command device configured to reduce standby-state energy consumption, in accordance with the teachings of the present invention.
Figure 2:
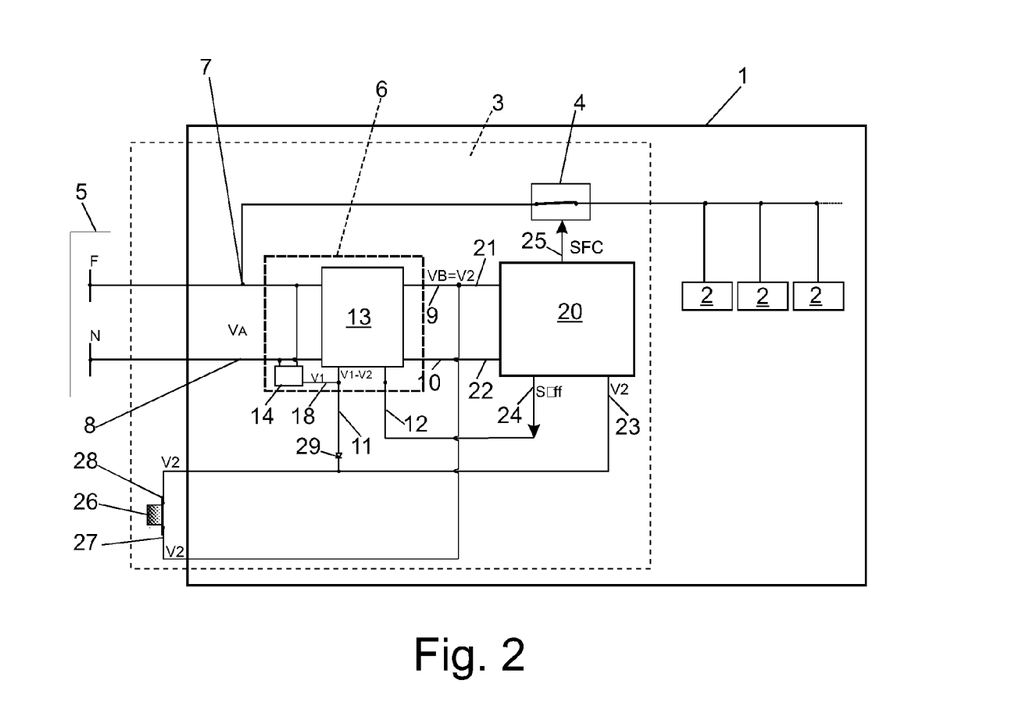
FIG. 2 shows, schematically, the household appliance of the electronic command device shown in FIG. 1, during an operating state.

Number 1 in the FIGS. 1 and 2 indicates as a whole an electric household appliance (shown schematically) such as a dish/laundry treatment machine, which can be, for example, a washing machine, or a dishwasher, or a drier or any other similar kind of dish/laundry treatment machine.

The electric household appliance 1 comprises a number of known electric/electronic devices/units, referred to hereinafter simply as household appliance electric loads 2, for performing several appliance operations, such as washing and/or drying operations, which, being known, are not described in detail.

According to an aspect of the invention, the electric household appliance 1 also comprises an electronic control device 3 which is configured to automatically switch the electric household appliance 1 to a standby state at the end of an operating state and, at the same time, reduce standby-state energy consumption, preferably, below about a one watt energy threshold.

The electronic control device 3 is configured to switch the electric household appliance 1 from a standby state to an operating state in response to a user's manual command, as described in detail below.

With reference to FIGS. 1 and 2, the electronic control device 3 comprises a switch relay 4 which is interposed between household appliance electric loads 2 and an electric power network 5, and is configured to switch, on the basis of a switch-on signal SFC, between an open state (shown schematically in the FIG. 1) cutting-off electric connection between electric power network 5 and household appliance electric loads 2, and a closed state (shown schematically in the FIG. 2), in which household appliance electric loads 2 are connected to, and powered by, the electric power network 5.

Preferably, the switch relay 4 is configured to be "normally open", i.e. it remains in the closed state in the presence of switch-on signal SFC, and switches automatically to the open state when it does not receive the switch-on signal SFC.

In the example shown in FIGS. 1 and 2, the electric power network 5 comprises a neutral line N having a first reference potential corresponding to a neutral potential, and a phase line F having a phase potential. Preferably, the electric power network 5 is able to generate an alternate supply voltage VA of about 220-230 V on the phase F and neutral N lines.

With regard to the electronic control device 3, it comprises an electronic control unit 20 which is configured to control several operations of household appliance electric loads 2. Furthermore, the electronic control unit 20 is configured to generate the switch-on signal SFC to selectively disconnect the household appliance electric loads 2 from electrical power network 5, by means of the switch relay 4, during the standby state.

The electronic control device 3 comprises a switching mode low power supply unit 6, which is configured to supply a prefixed supply voltage VB to the electronic control unit 20.

In the example shown in FIGS. 1 and 2, the switching mode low power supply unit 6 comprises at least a control terminal, and at least an output terminal, which supply the prefixed supply voltage VB to the electronic control unit 20. In detail, the switching mode low power supply unit 6 is configured to switch between the standby state and the operating state, when detects a first prefixed voltage variation ΔV on the control terminal.

According to the present invention, the electronic control device 3 is configured to connect, at least temporarily, the control terminal to the output terminal having the prefixed supply voltage VB, to generate the first prefixed voltage variation ΔV on the control terminal to cause the switching mode low power supply unit 6 to switch from the standby state to the operating state.

With reference to the FIGS. 1 and 2, switching mode low power supply unit 6 comprises: two input terminals 7 and 8 respectively connected to the phase line F and the neutral line N of the electric power network 5 to receive the main supply voltage VA; two output terminals 9 and 10, one of which has a prefixed potential VB while the other terminal has a reference potential VG.

The switching mode low power supply unit 6 may be configured to supply a low direct supply voltage VB having a nominal value VB=V3=4-12 Volts, and preferably VB=V3=5 Volts through output terminals 9 and 10. Preferably, but not necessarily, nominal potential VB on the output terminal 9 may be about 4-12 volts, preferably 5 volts, while reference potential VG on the output 10 may be a ground potential.

In the example shown in FIGS. 1 and 2, the switching mode low power supply unit 6 comprises a first control terminal 11 and is configured to switch from the standby state to an operating state, when detects the first prefixed voltage variation ΔV on the first control terminal 11.

The switching mode low power supply unit 6 detects the first prefixed voltage variation ΔV when the voltage on the first control terminal 11 changes from a high value corresponding to a first prefixed supply voltage V1 to a low value corresponding to a second prefixed supply voltage V2.

During the standby state, the switching mode low power supply unit 6 outputs low supply voltage VB having the second prefixed supply voltage V2, i.e. VB=V2=0 V, whereas in the operating state the switching mode low power supply unit 6 outputs the low supply voltage VB having the nominal value V3, i.e. VB=V3.

Switching mode low power supply unit 6 further comprises a second control terminal 12, and is configured to switch from the operating state to the standby state, on receiving a command signal Soff on the second control terminal 12.

In the example shown in FIGS. 1 and 2, switching mode low power supply unit 6 comprises a switching regulator unit 13, which receives the main supply voltage VA by means of the input terminals 7 and 8, and is configured to output the low supply voltage VB to the electronic control unit 20, by means of output terminals 9 and 10 of the switching mode low power supply unit 6.

The switching regulator unit 13 presents two control terminals corresponding to the first 11 and the second control terminal 12 respectively of the switching mode low power supply unit 6 and is configured to switch from the standby state, wherein it outputs the low supply voltage VB having the second supply voltage V2=0, to the operating state, wherein it outputs the low supply voltage VB having the nominal value V3, when the voltage on the first control terminal 11 varies from the first V1 to the second supply voltage V2, i.e. first variation voltage ΔV.

The switching regulator unit 13 is further configured to switch from the operating state to the standby state when the second control terminal 12 receives the command signal Soff.

In the standby state, switching regulator unit 13 is completely off, so as to draw zero electric power, whereas in the operating state, it is on and outputs low supply voltage VB having the nominal value V3 to the electronic control unit 20.

Switching mode low power supply unit 6 further comprises a low voltage power supply circuit 14 connected to the electric power network 5 to receive the main supply voltage VA and presenting an output terminal 18 connected to the first control terminal 11 of the switching regulator unit 13.

Preferably, the low voltage power supply circuit 14 is configured to generate the first supply voltage V1 on the output terminal 18 during at least the standby state. Preferably, the low voltage power supply circuit 14 is configured to continuously generate the first supply voltage V1 on the output terminal 18 during at least the standby state so as to continually supply the first supply voltage V1 to the first control terminal 11 of the switching regulator unit 13. Preferably, the low voltage power supply circuit 14 is configured to continuously generate the first supply voltage V1 on the output terminal 18 during both standby and operative states.

Preferably, when switching mode low power supply unit 6 is in the standby state, low voltage power supply circuit 14 is on and keeps terminal 11 of switching regulator unit 13 at first supply voltage V1.

The low voltage auxiliary power supply circuit 14 comprises a low consumption supply circuit configured to generate the first supply voltage V1 having a value of about 3-6 Volt, and consume an electric power lower than about 10 mW.

It should be pointed out that low voltage auxiliary power supply circuit 14 and switching regulator unit 13 may be advantageously integrated in the same electronic circuit.

Regarding electronic control unit 20, it may comprise preferably, but not necessarily, a microprocessor, and has two input terminals 21, 22 connected to output terminals 9, 10 respectively of the switching regulator unit 13 to receive low supply voltage VB.

Electronic control unit 20 comprises an output terminal 25 supplying the switch-on signal SFC to the switch relay 4; a sensing terminal 23; and an output terminal 24 generating the command signal Soff.

In the example shown in FIGS. 1 and 2, the output terminal 24 is connected to the second control terminal 12 of the switching regulator unit 13 and the electronic control unit 20 is configured to generate the command signal Soff when it determines a prefixed variation voltage or a determinate voltage on the sensing terminal 23.

Preferably, electronic control unit 20 is configured to generate the command signal Soff on the basis of the prefixed variation voltage on the sensing terminal 23 and according to the appliance operating states. In detail, electronic control unit 20 may be configured to output command signal Soff when detects the prefixed variation voltage on the sensing terminal 23 during predetermined operative phases of the dish-laundry treatment cycles, i.e. when the dish-laundry treatment cycles is completed.

The electronic control unit 20 is further configured to switch to an on-state, when it is supplied with the nominal low supply voltage VB having the nominal voltage VB=V3 on the inputs terminals 21 and 22, and to the off-state, when inputs terminals 21 and 22 are supplied with second supply voltage VB=V2=0 volt.

The electronic control device 3 further comprises a pushbutton 26, which has a first terminal 27 connected to output terminal 9 of the switching regulator unit 13 of the switching mode low power supply unit 6, and a second terminal 28 connected to the sensing terminal 23 of electronic control unit 20.

The second terminal 28 of the pushbutton 26 is further connected to first control terminal 11 of the switching regulator unit 13 of the switching mode low power supply unit 6, through a one-way electronic component, such as a diode 29.

In the example shown in the attached FIGS. 1 and 2, the diode 29 has the anode terminal connected to the first control terminal 11 of the switching regulator unit 13 of the switching mode low power supply unit 6, and the cathode terminal connected to the second terminal 28 of the pushbutton 26.

Operation of electronic control device 3 of the electric household appliance 1 will now be described, assuming that the switching mode low power supply unit 6 is initially in the standby state.

In detail, if switching mode low power supply unit 6 is in the standby state, low voltage power supply circuit 14 is on and keeps terminal 11 of switching regulator unit 13 at first supply voltage V1.

Accordingly, switching regulator unit 13 is in the off-state and low supply voltage VB on the output terminal 9 presents the second supply voltage, i.e. VB=V2=0 Volt.

At this stage, electronic control unit 20 is also in the off-state, and switch relay 4, not receiving switch-on signal SFC, stays open, thus cutting off power to electric loads 2, i.e. disconnecting them from electric power network 5.

In connection with the above, it should be pointed out that, at this stage, consumption of control device 3 only advantageously amounts to consumption of auxiliary supply circuit 14, i.e. 10 mW, since the switching regulator unit 13 and the electronic control unit 20 are completely switch off.

Appliance 1 is turned on by pressing pushbutton 26.

More specifically, when user presses the pushbutton 26, it connects output terminal 9, at second supply potential V2 to first control terminal 11 of switching mode low power supply unit 6, and to sensing terminal 23 of electronic control unit 20.

At this stage, the voltage on the first control terminal 11 of the switching regulator unit 13 impulsively changes from V1 to V2 causing the first prefixed variation voltage ΔV.

On detecting the first prefixed variation voltage ΔV on the first control terminal 11, the switching regulator unit 13 of the switching mode low power supply unit 6 switches from the standby state to the on-state, and so generates a low supply voltage VB of nominal value V3.

Being powered with nominal value V3, electronic control unit 20 switches from the off-state to the on-state, and generates switch-on signal SFC that closes switch relay 4 to power electric loads 2 from electric power network 5.

It should be pointed out that in the above disclosed phase, push button 26 is maintained pressed for at least a first predetermined time interval Δt1, and the switching regulator unit 13 is configured to change the low supply voltage VB from V2 to V3 in a interval lower than the first predetermined time interval Δt1. Moreover, when the electronic control unit 20 receives the low supply voltage VB, it completes the switch-on step in a time shorter than the first predetermined time interval Δt1. For example, the first predetermined time interval Δt1 may be at least 200 ms, whereas the switch regulator unit 13 and electronic control unit 20 may be configured to switch from stand-by state to operative state in less of 20 ms.

Therefore electronic control unit 20 may be configured to advantageously detect a turn-on user command, i.e. a command to switch the switching regulator unit 13 from standby state to operating state by the user pressing pushbutton 26, when it detects nominal voltage V3 at the sensing terminal 23 in the initial instant wherein electronic control unit 20 switches from the off-state to the on-state.

Switching of electric household appliance 1 from the operating state to the standby state may be controlled by the electronic control unit 20 by means of the command signal Soff.

Preferably, electronic control unit 20 may automatically generate the command signal Soff at the end of an operating cycle to switch the switching mode low power supply unit 6 to the standby state.

Preferably, electronic control unit 20 may automatically generate the command signal Soff when the user presses pushbutton 26 and, preferably, predetermined operating phases of the operating cycle are ended.

By pressing the pushbutton 26, user causes a temporary connection between the output terminal 9 of switching mode low power supply unit 6 having nominal voltage V3, and the sensing terminal 23 having a different prefixed voltage, so as to generate in this way the predetermined voltage variation on the sensing terminal 23.

At this stage, on detecting nominal voltage V3 on sensing terminal 23 generated by a user turn-off command, electronic control unit 20 controls, preferably, whether the current operative cycle can be interrupted, i.e. verifies if current household appliance operative phase corresponds or not to one of predetermined interruptible operating phases, and after that it determines to generate (turn-on) command signal Soff.

After receiving the command signal Soff on the second control terminal 12, switching mode low power supply unit 6 switches to the standby state so as to generate the second supply voltage VB=V2=0V. Interruptions of voltage supply VB to the electronic control unit 20 causes electronic control unit 20 itself to switch from the on-state to the off-state. Being in a switch off state, electronic control unit 20 does not generate the switch on signal SFC and, in consequence, the switch relay 4 opens and cuts electric power to electric loads 2.

Electronic control unit 20 is advantageously configured to determine a power fail when, on switching from the off-state to the on-state, it temporarily detects the nominal voltage value V3 on said sensing terminal 23.

In fact, at the end of the power fail, the voltage of the first control terminal 11 of the switching regulator unit 13 is the first supply voltage V1 so that the switching regulator unit 13 automatically switches on the operative state and consequently supplies the nominal voltage V3 to the electronic control unit 20 that automatically switches on.

At this stage, the electronic control unit 20 is able to determine that a power fail happened on the basis of voltage on sensing terminal 23.

In detail, if electronic control unit 20, during its switching-on phase, detects nominal voltage V3, i.e. the predetermined variation voltage on sensing terminal 23, it determines that pushbutton 26 has been pressed and so identifies a user standby command.

On the other hand, if electronic control unit 20, during its switching-on phase does not detects any variation voltage on sensing terminal 23, i.e. does not detect nominal voltage V3, it determines that a power fail happened and may command to generate the command signal Soff so as to automatically switch the electric household appliance into the standby state, or may continue the operative phase interrupted by the power fail.

The electronic control device of the electric household appliance described has the major advantage of performing the same standby-state control functions as known control circuits, but using extremely simple, and therefore low-cost circuit architecture, which fully complies with current legal standards governing energy consumption.

In fact, in the standby state, the electronic control device only keeps the auxiliary supply circuit of the switching mode low power supply unit on, which consumes roughly $10*10^{-3}$ watts, i.e. well below the regulation 1 watt threshold.

Moreover, the circuit architecture of the electronic control device conveniently provides for easily and cheaply determining power fails in the electric power network.

Clearly, changes may be made to the electric household appliance and electronic control device as described and illustrated herein without, however, departing from the scope of the present invention.

Figure 3:
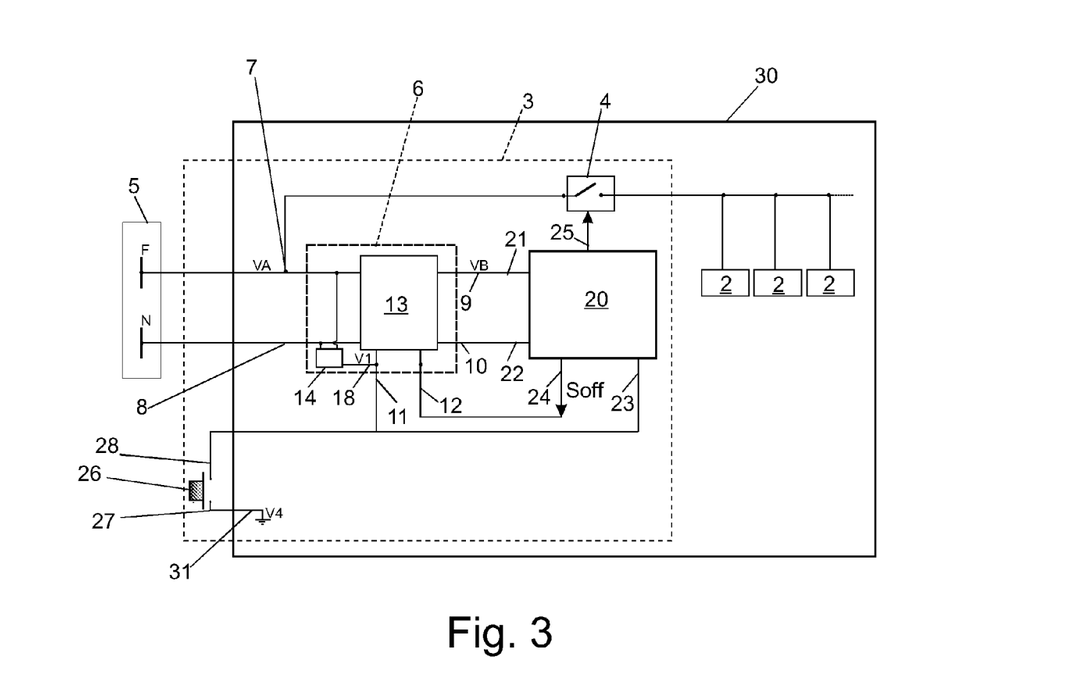
FIG. 3 shows, schematically, a first variation of the electronic command device of the household appliance shown in FIG. 1.

The FIG. 3 embodiment relates to an electric household appliance 30 similar to electric household appliance 1, and the component parts of which are indicated, wherever possible, use the same reference numbers as for corresponding parts of electric household appliance 1.

Electric household appliance 30 differs from electric household appliance 1 by the pushbutton 26 having the first terminal 27 connected to an auxiliary terminal 31 having a prefixed voltage V4 different from voltage V1 outputted from the low voltage power supply circuit 14. Preferably, the auxiliary terminal 31 may be a ground terminal and the prefixed voltage V4 may be zero Volt.

In the embodiment shown in FIG. 3, electronic control unit 30 may be configured to determine and advantageously detects a switch-off user command, i.e. a command to switch the switching regulator unit 13 from operating state to standby state by the user pressing pushbutton 26, when it temporarily detects voltage V4 on the sensing terminal 23 after a prefixed time from its initial switch-on instant.

Figure 4:
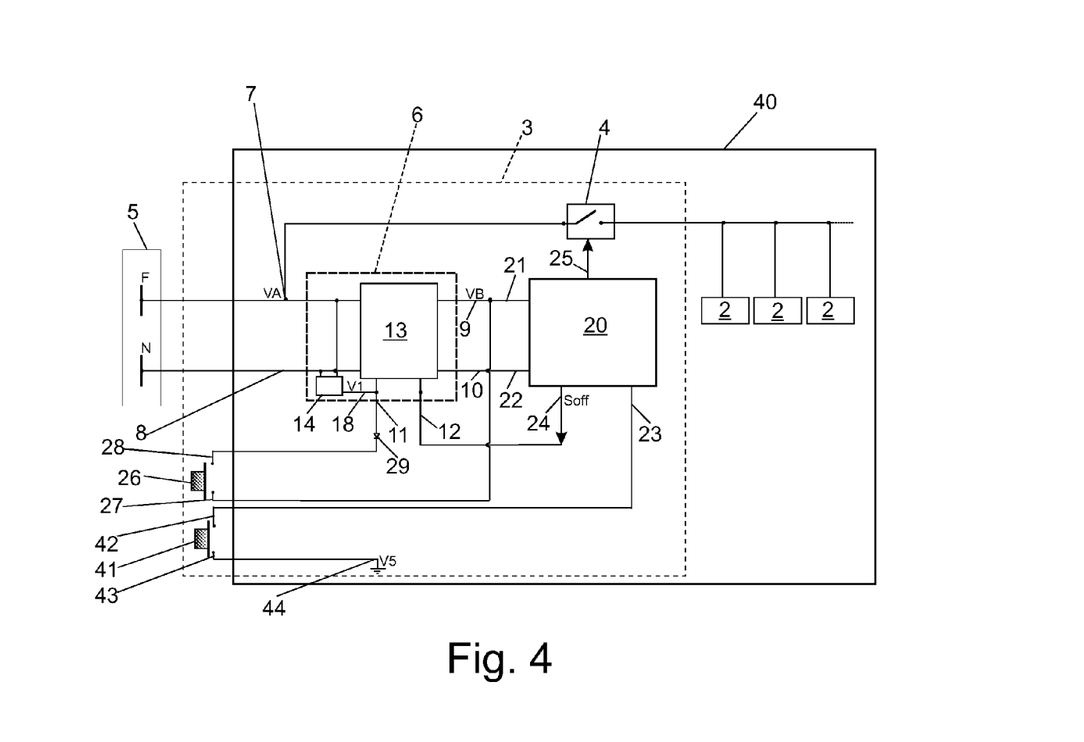
FIG. 4 shows schematically a second variation of the electronic command device of the household appliance shown in FIG. 1.

The FIG. 4 embodiment relates to an electric household appliance 40 similar to electric household appliance 1, and the component parts of which are indicated, wherever possible, use the same reference numbers as for corresponding parts of electric household appliance 1.

Electric household appliance 40 differs from electric household appliance 1 by the pushbutton 26 having the first terminal 27 connected to output terminal 9 of the switching regulator unit 13 of the switching mode low power supply unit 6, and the second terminal 28 connected only to first control terminal 11 of the switching regulator unit 13.

Moreover, the electric household appliance 40 comprises an additional pushbutton 41 having a first terminal 42 connected to an auxiliary terminal 44 having a prefixed voltage V5, i.e. V5=0 Volt, and a second terminal 43 connected to the sensing terminal 23 of the electronic control unit 20.

According to this embodiment, when electric household appliance 40 is in the standby state and the user pushes the pushbutton 26, the switching regulator unit 13 detects the first variation voltage $\Delta V=V1-V2$ and switches from standby state to operating state.

On the other hand, when electric household appliance is in operating state and user pushes the pushbutton 41, the electronic control unit 20 detects the predetermined variation voltage on the sensing terminal 23 and on the basis of the household appliance operative phases, generate the command signal Soff that switches the switching regulator unit 13 from the operating state to the standby state.

The invention claimed is:

1. A method for reducing standby-state energy consumption of an electric household appliance comprising an electronic control unit and a switching mode low power supply unit comprising a switching regulator unit having a first control terminal and at least an output terminal which supplies a main prefixed supply voltage to the electronic control unit; the switching mode low power supply unit being further configured to switch from a standby state to an operating state, when a prefixed voltage variation on the first control terminal is detected;

said method comprising:

supplying a low supply voltage different than zero to said first control terminal during at least said standby state; and connecting, at least temporarily, said first control terminal to said output terminal, or to an independent auxiliary terminal having a predetermined voltage, to generate said prefixed voltage variation on the first control terminal so as to cause said switching regulator unit to switch from the standby state to the operating state.

2. A method according to claim 1, wherein the predetermined voltage is a zero voltage.

3. A method according to claim 1, wherein the connecting comprises:

connecting, at least temporarily, said first control terminal to said output terminal, wherein said output terminal has a zero voltage during said standby state.

4. A method according to claim 1, wherein said switching regulator unit has a second control terminal and is further configured to switch from the standby state to the operating state, when it receives a command signal on the second control terminal;

said method comprising the step of generating said command signal according to a voltage of said output terminal.

5. A method according to claim 4, wherein said electronic control unit comprise a sensing terminal and is configured to generate said command signal when it detects a voltage variation on said sensing terminal;

the method comprising the step of connecting said sensing terminal to said output terminal to generate the voltage variation on said sensing terminal to cause the electronic control unit to generate said command signal.

6. A method according to claim 1, wherein said switching mode low power supply unit comprises:

a low voltage auxiliary supply designed to supply said low supply voltage to said first control terminal during at least the standby state;

the method comprising the steps of, during said standby state, turning-off said switching regulator unit and maintaining a turn-on state of said low voltage auxiliary supply to supply said low supply voltage to said first control terminal.

7. A method according to claim 1, wherein the connecting comprises connecting, at least temporarily, said first control terminal to said independent auxiliary terminal having a zero voltage.

8. A method according to claim 1,
wherein the supplying the low supply voltage to said first control terminal during at least said standby state comprises supplying a second predetermined voltage during the operating state and maintaining the second predetermined voltage during the standby state, and
wherein the second predetermined voltage is between 3 volts and 6 volts.

9. A household appliance comprising:
an electronic command device configured to reduce standby-state energy consumption of the household appliance, the electronic command device comprising:
an electronic control unit; and
a switching mode low power supply unit comprising:
a switching regulator unit having a first control terminal and at least an output terminal which supplies a main prefixed supply voltage to the electronic control unit, the switching mode low power supply unit being further configured to switch from a standby state to an operating state, when it detects a prefixed voltage variation on the first control terminal;
wherein said switching mode low power supply unit comprises an auxiliary supply which supplies a low supply voltage different than zero to said first control terminal during at least said standby state, and
wherein said electronic command device is configured to connect, at least temporarily, said first control terminal to said output terminal, or to an independent auxiliary terminal having a predetermined voltage, to generate said prefixed voltage variation on the first control terminal so as to cause said switching regulator unit to switch from the standby state to the operating state.

10. A household appliance according to claim 9, wherein the predetermined voltage is a zero voltage.

11. A household appliance according to claim 9,
wherein said switching regulator unit has a second control terminal and is further configured to switch from the standby state to the operating state, when it receives a command signal on the second control terminal.

12. A household appliance according to claim 9, wherein said switching regulator unit has a second control terminal and is further configured to switch from the standby state to the operating state, when it receives a command signal on the second control terminal;
said electronic control unit being configured to generate said command signal on the basis of a voltage of the output terminal.

13. A household appliance according to claim 12, wherein said electronic control unit comprises a sensing terminal and is configured to generate said command signal when it detects a predetermined voltage variation on said sensing terminal.

14. A household appliance according to claim 9, wherein said electronic command device comprises a switch having a first terminal and a second terminal respectively connected to said output terminal and to said first control terminal, wherein operation of said switch causes the prefixed voltage variation on said first control terminal or generation of a turn-off signal on the basis of a voltage of said output terminal.

15. A household appliance according to claim 14, wherein said switch comprise a pushbutton.

16. A household appliance according to claim 9, wherein said electronic control unit is configured to automatically switch from an on-state to an off-state, when said switching regulator unit switches the switching mode low power supply unit to said standby state.

17. A household appliance according to claim 16, wherein said electronic control unit is configured to determine a power fail when, on switching from the off-state to the on-state, it detects no voltage variation on a sensing terminal.

18. A household appliance according to claim 9, wherein said electronic command device comprises a switch configured to connect, at least temporarily, said first control terminal to said independent auxiliary terminal having a zero voltage.

19. A household appliance according to claim 9, wherein the low supply voltage is lower than a voltage supplied to an electric load of the household appliance.

20. A household appliance according to claim 9, wherein said auxiliary supply is configured to constantly hold the first control terminal at the low supply voltage throughout both the operating state and the standby state.

* * * * *